United States Patent
Onkes et al.

(10) Patent No.: US 11,095,848 B1
(45) Date of Patent: Aug. 17, 2021

(54) METHOD FOR CREATING VERTICALLY ORIENTED VIDEO

(71) Applicant: Screenshare Technology Ltd., Nicosia (CY)

(72) Inventors: Yanis Onkes, Los Angeles, CA (US); Timur Bekmambetov, Moscow (RU); Mikhail Kulikov, Moscow (RU)

(73) Assignee: Screenshare Technology Ltd., Nicosia (CY)

( * ) Notice: Subject to any disclaimer, the term of this patent is extended or adjusted under 35 U.S.C. 154(b) by 0 days.

(21) Appl. No.: 16/541,721

(22) Filed: Aug. 29, 2019

Related U.S. Application Data

(60) Provisional application No. 62/836,426, filed on Apr. 19, 2019.

(51) Int. Cl.
*H04N 7/01* (2006.01)
*H04N 9/87* (2006.01)
*H04L 29/06* (2006.01)

(52) U.S. Cl.
CPC ....... *H04N 7/0117* (2013.01); *H04L 65/4023* (2013.01); *H04N 9/87* (2013.01)

(58) Field of Classification Search
CPC ............................... H04N 7/0117; H04N 9/87
See application file for complete search history.

(56) References Cited

U.S. PATENT DOCUMENTS

| 2015/0189169 A1* | 7/2015 | Ikeda | H04N 5/23219 348/218.1 |
|---|---|---|---|
| 2015/0193911 A1* | 7/2015 | Mochizuki | G06F 3/1415 345/668 |
| 2019/0019476 A1* | 1/2019 | Ge | G06F 3/0481 |
| 2020/0020071 A1* | 1/2020 | Frey | G09G 5/373 |

\* cited by examiner

*Primary Examiner* — Girumsew Wendmagegn
(74) *Attorney, Agent, or Firm* — Bardmesser Law Group

(57) ABSTRACT

Playing video in a format that matches user device includes downloading a video from a server; loading the video into a player; checking if the video contains metadata specifying resolution and crop parameters that matches user device; if metadata is found, then identifying a frame from the video and define a focus point in center of frame; limiting view of the frame and reduce/enlarge video resolution inside viewzone based on the metadata or data; displaying viewzone so that vertical dimension of the viewzone matches a vertical dimension of the user device, and the focus point remains in the center of the frame and in the center of the user device; upon user rotation of the user device, re-displaying the frame such that the focus point remains in the center of the device, and a horizontal dimension of the viewzone matches a horizontal dimension of user device; and continuing rendering subsequent frames of the video, layers and effects.

20 Claims, 8 Drawing Sheets

METHOD FOR CREATING VERTICALLY ORIENTED VIDEO

CROSS REFERENCE TO RELATED APPLICATIONS

This application is a non-provisional of U.S. Provisional Patent Application No. 62/836,426, filed on Apr. 19, 2019.

BACKGROUND OF THE INVENTION

Field of the Invention

This invention relates to a system and method for playing video in a manner that optimizes a viewing area (e.g., a viewzone inside player) for specific user device screen resolution and orientation.

Description of the Related Art

Originally, when film (and later television) content was created, there were only a handful of video formats and aspect ratios. Typical film was shot at a 4:3 aspect ratio, and typical TV content was shot at a 16:9 aspect ratio. Both were horizontal in layout, since there was no need to generate or play back vertically oriented video.

In recent years, the proliferation of electronic devices has presented a problem for the playback of content with standard resolution and aspect ratios, since many computer monitors, mobile phones and tablets have different aspect ratios and resolutions, and can be oriented vertically as well as horizontally (and the orientation can change during the playback when the user rotates the smartphone or tablet). Video that is only recorded at one resolution may be displayed sub-optimally or poorly on some screens and at some orientations.

Accordingly, a mechanism for playing video that is automatically optimized for the user's device, is desired.

SUMMARY OF THE INVENTION

This invention relates to video playback at different resolutions and screen orientations, that matches the user's device, that substantially obviates one or more of the disadvantages of the related art.

In one aspect, a method for playing video in a format that matches a user device, the method includes downloading a video from a server; loading the video into a player; checking if the video contains metadata specifying resolution and crop/margin parameters that matches the particular user device; if the metadata is found, then (i) take a frame from the video and define a focus point in a center of the frame; (ii) limit view of the frame and reduce the resolution based on the metadata; (iii) displaying the viewzone so that a vertical dimension of the viewzone matches a vertical dimension of the user device, and the focus point remains in the center of the frame and in the center of the user device (note that the frame itself is not altered—to form the viewzone, typically the original frame is used, with the edges (top/bottom or left/right) removed for the display); (iv) upon user rotation of the user device, re-displaying the frame such that the focus point remains in the center of the device, and a horizontal dimension of the viewzone matches a horizontal dimension of the user device; and (v) continuing rendering subsequent frames of the video according to (i)-(iv). Note that the video file itself is not changed, only the viewing area is changed.

Optionally, a user inputs left margin, right margin, top margin, bottom margin, time code and/or frame number, as the metadata. Optionally, a user uses a software tool to visually define the area to be displayed. Optionally, a user defines parameter values for a frame that are the same as parameter values for a previous frame. Optionally, the metadata is structured as XML or JSON. Optionally, the user device is any of a smartphone, tablet, a desktop computer, and a TV set. Optionally, the player detects resolution changes in the user device due to rotation, and sets the video rendering into a vertical or horizontal mode.

Optionally, the player detects device rotation, and displays only a specific/limited part of the video, depending on the device screen resolution (either vertical or horizontal). Optionally, each viewzone or portion of the frame can be expanded or shrunk or the entire video (displayed in a viewzone) to fit it into a player canvas. Optionally, areas in the video are defined based on a context and differences in pixel positions between frames. Optionally, focus point is defined by the player based on a most pronounced pixel shift in the frame. Optionally, the automatic selection of the displayed portion of the video changes during the playback.

Optionally, in response to a user moving the user device, the displayed area shifts in a given direction, similar to 360° videos. Optionally, the player supports two playback regimes: (1) the frame fully fits within the screen, and any marginal space is rendered in black, and (2) the frame is stretched along a maximum dimension, and a remainder of the frame is outside the screen. Optionally, the playback regime is set by the user. Optionally, the playback regime is set by the metadata. Optionally, a timecode or frame number is used to rotate the frame and the viewzone parameters. Optionally, a rotation of the device results in a smooth transitioning, with the incremental change of the parameters from a first set to a second set.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
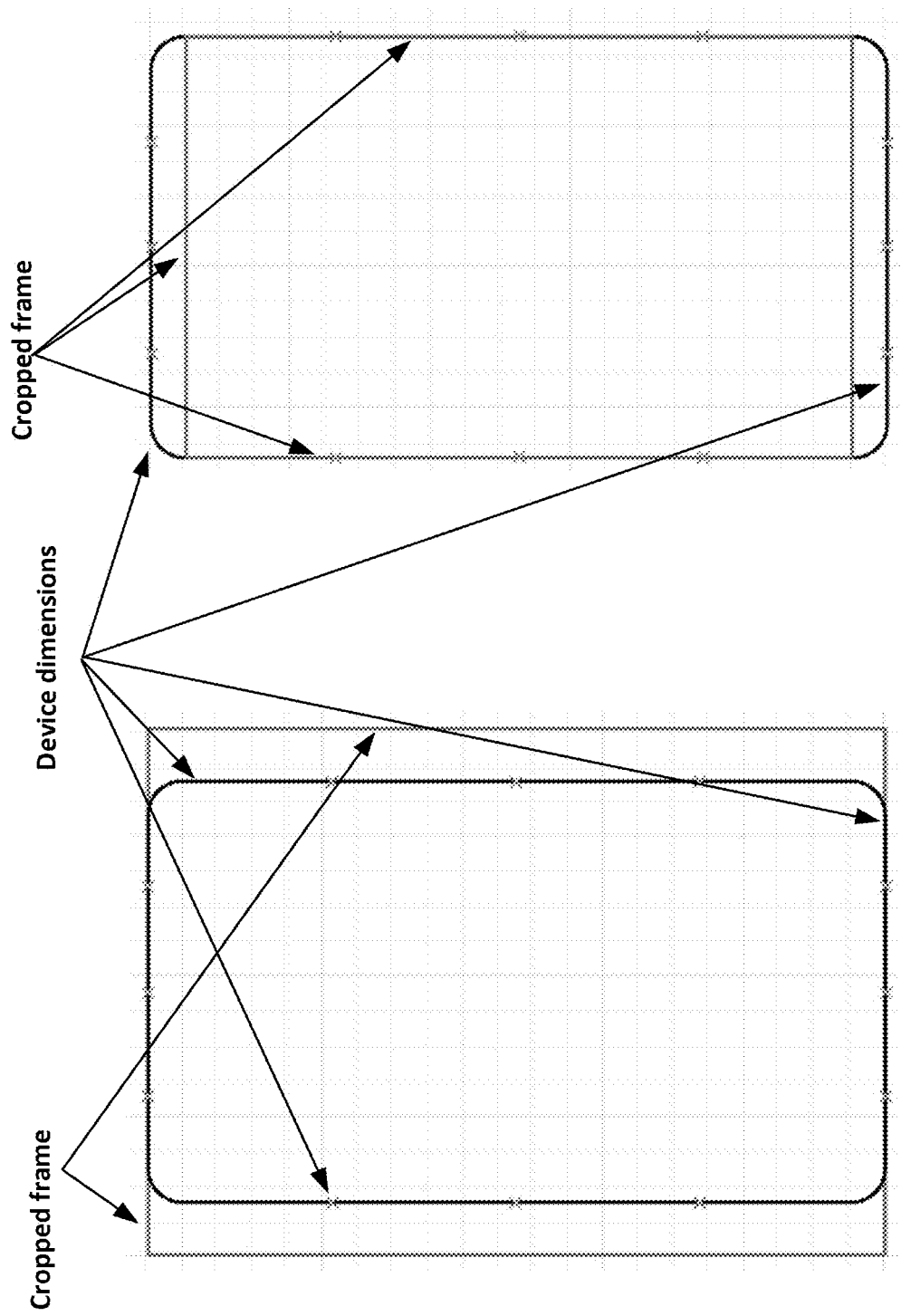
FIG. 1 shows a situation where the user has expanded the video to fit vertically, with part of the frame being outside the device (on left), and on right, where the video fits horizontally, but leaves some black space in the vertical direction.

Reference will now be made in detail to the preferred embodiments of the present invention, examples of which are illustrated in the accompanying drawings.

The present invention is directed to a system and method for a video player operating in different resolutions. A method for marking up and playing video streams depending on the device screen resolution is proposed. The proposed method has its own data format (hereinafter, VV format) that is generated in an editor and can be played by the player. First, the author inputs parameter values corresponding to frame size, frame position and time code. The parameter values may be stored in a database, a file as metadata, or on any other form of storage. For example, the file header may contain the parameter values for a number of possible user devices (e.g., iPhone 1, 2, 3, 5, 7, 10, Samsung Note 3, Samsung Note 4, iPad 2, etc.). Alternatively, the database can be maintained on the user device, and populated by downloading a parameter file from a known source, where the parameter file is created by the content author and loaded on a server together with the video file itself.

After that, the claimed player plays the video displaying only the area corresponding to the parameter values input before. Also, the player determines the resolution for each frame and enlarges or reduces it inside viewing area depending on the device type, its orientation and screen resolution (in accordance with the data in VV format).

As an example, the user may input the following values to define the area to be displayed on the screen: left margin, right margin, top margin, bottom margin, time code or frame number. VV data may be provided, for example, for any device type, for any resolution, and/or for a vertical or horizontal resolution. The user may use a software tool to visually define the area to be displayed.

As a further example, the user may define a VV data placeholder for a specific frame, denoting that the identified frame has the same parameter values as the previous one. As a further example, the data may be structured in any text format, such as XML, JSON, db, etc. The data may be stored in any kind of storage, such as file metadata, database, file system, etc. The player may play video on any device, including mobile devices, tablets, desktop computers, and TV sets.

As a further example, the player may detect resolution changes in the device, setting the screen into a vertical or horizontal mode. As a further example, the player may detect device rotation, displaying video through resized/reduced viewing area, depending on the device screen resolution (either vertical or horizontal). As a further example, the player may expand or shrink each viewzone or the entire displayed resized video to fit it into the player canvas. The frame itself is not altered—to form the viewzone, typically the original frame is used, with the edges (top/bottom or left/right) removed for the display.

VV formatting can also be made without the user's input. Areas can be defined based on the context and differences in colors of pixels and positions of pixel groups between frames. The frame focus can be defined based on the most pronounced pixel shift in the frame. As an option, VV formatting may automatically change during the playback. The user may rotate and physically move the device, so that the displayed area shifts in the given direction, similar to 360° videos.

In an exemplary embodiment, the author (i.e., any user that prepares the data for the player) starts the editor (i.e., a piece of software for visual editing of VV data) and marks selection areas in each frame for vertical resolution. Then, the author loads the video and VV data into the player (i.e., a piece of software for playing videos, that is capable of reading VV data). Then, the mobile device user starts the application and runs a special VV player, with device rotated horizontally, opens the video in it and watches it in its original resolution, e.g., 1024×768 px.

When the video is loaded, the player checks its VV data and defines possible resolutions. At some point in time during the playback, the user may rotate the device from a horizontal position into a vertical position. The player registers the user's actions and changes in the device orientation and then checks whether there is provided a vertical resolution type in the VV data. If VV data for a vertical device type (i.e., screen orientation) are found, the player reads them and applies them to each frame. For instance, frame 37 has the following parameters in VV format: margin left: 220 px, margin right: 280 px, margin top: 4 px, margin bottom: 14 px. When the player reads frame 37, it displays only the 524×750 px area with the corresponding margins from the edges of the original video resolution, leaving out the rest. When displaying enlarged/reduced frames in the form of viewzones, the player may either expand or shrink the frames to fit them into its own canvas.

If the next frame, i.e., frame 38, is tagged with the special placeholder "prf", it will be displayed using the same edge parameters. If frame 39 has different parameter values, the player will read them and display a different area. When the user changes the screen orientation, the VV player checks whether there is provided a given resolution (or orientation) in the VV data. If such information is provided, the player will continue the playback using this set of data; if not, the player will play the video in its original resolution.

In another embodiment, two videos with different resolutions may be merged together on a single-resolution "canvas". When the first video is being played at a first resolution (and viewzone parameters) and the device is rotated, the second video (at its resolution and viewzone parameters) is advanced to by a pre-determined amount of time from the beginning (i.e., the length of the first video that had been played so far) and is played back from that time position. When the device is rotated again, the first video is advanced by the same amount of time (the length of the second video that was played), and the playback continues from there.

In yet another embodiment, the player may be developed as an SDK (software developer's kit) that can be integrated into various frameworks as a code library.

A sample VV format is shown below:

```
<vertical>
    <effect type="center" frame="3" value="0.4, 0.3">          ←center of the main
frame relative to the screen
    <effect type="center" frame="233" value="0.4, 0.3">
    <effect type="center" frame="1233" value="0.1, 0.5">
    <effect type="scale" frame="13898" value="2, 2">           ←scaling relative to
the frame, stretched by the minimum side of the screen
    <effect type="rotate" frame="14001" value="129">           ←rotation of
frame in degrees relative to position 0
    <effect type="center" frame="14001" value="0.2, 0.3">
    <effect type="rotate" frame="14001">                       ←anonymized
change of the values, based on the keys, where the change is smooth within the timing
parameters of the keys. For example, during frames 40 through 50, the value will smoothly
change from 123 to 111
        <animation>
            <value frame="10" value="128">
            <value frame="12" value="127">
            <value frame="40" value="123">
            <value frame="50" value="111">
            <value frame="60" value="110">
        </animation>
    </effect>
</vertical>
```

The VV format includes a focus state conversion time code, which is given in seconds relative to the previous frame.

For each frame state (a frame state is a set of parameters that describe the current distortion; for example, the viewzone parameters are indicated above in the frame state), the following data items are typically provided:

Margins, in relative values, where 1 is the full frame width or height. For example, Margin.R=0.1 means that the right margin equals 0.1*(original frame width). This parameter is optional. If not provided, the frame is displayed in its original size.

Figure 2:
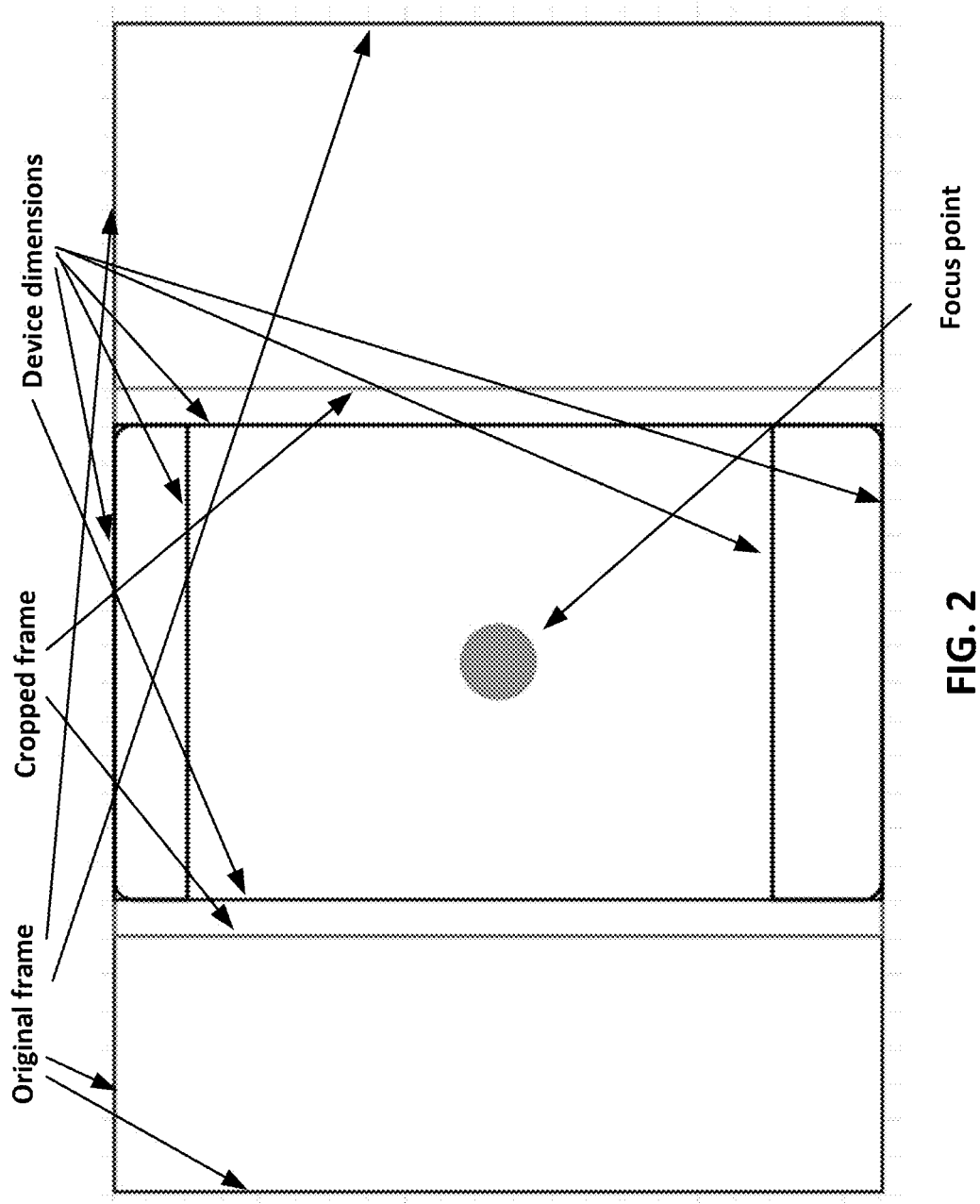
FIG. 2 shows a sample markup 18:9 device screen ratio.
Figure 3:
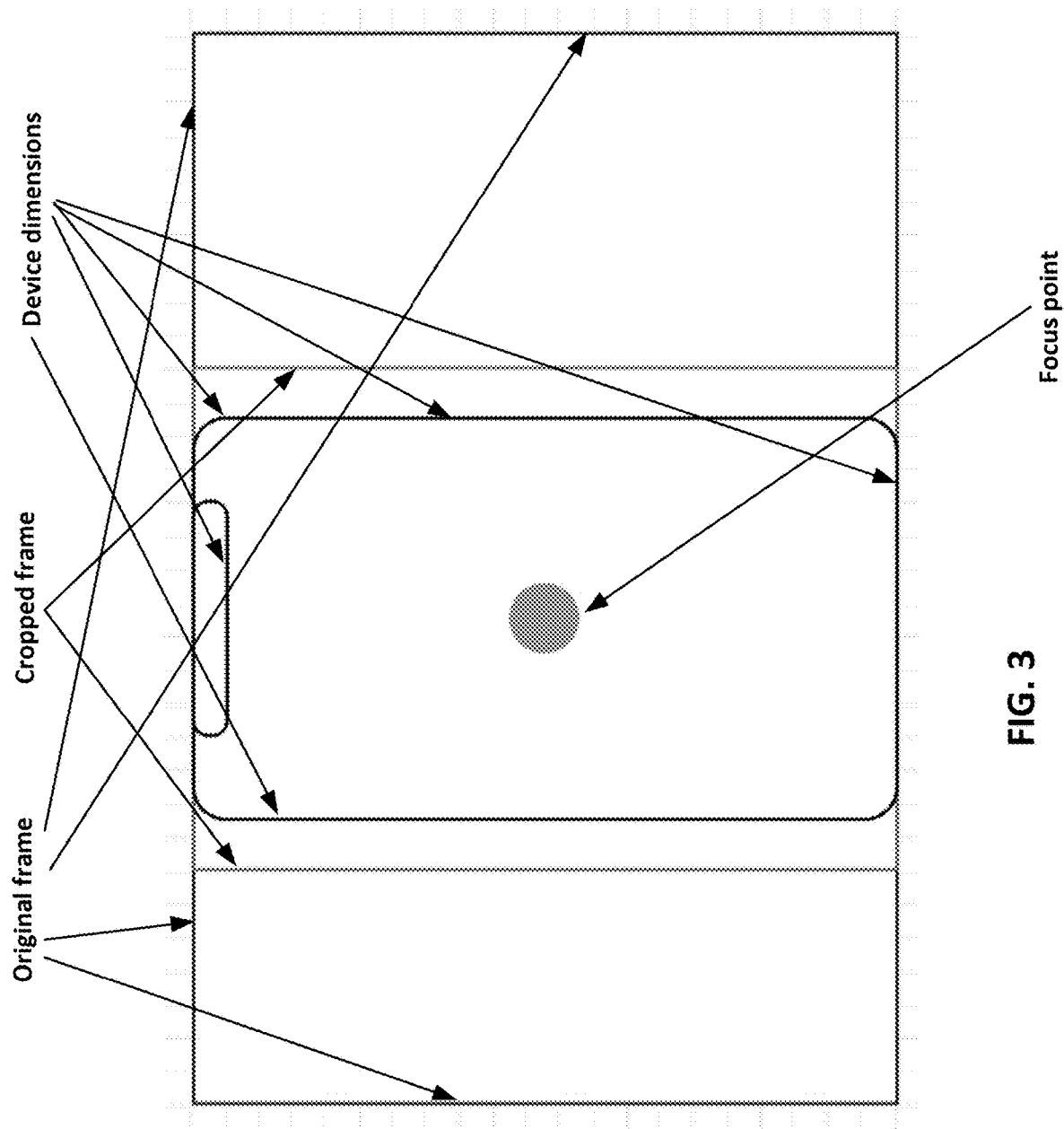
FIG. 3 shows the full frame (which is much larger than the device), which is displayed as a viewzone so that the vertical dimension matches the device, and parts of the viewzone in the horizontal direction extend beyond the device.

Focus coordinates, a focus dot that is located in the center of the viewing screen when the video is played by the player, so that the same format could be supported by different screens. The focus dot is indicated in absolute or relative parameters. For example, (0.3,0.5) in absolute terms—30 percent on the left and 50 percent on the bottom; if the parameter is specified in absolute, then this value can also be (120 pix, 100 pix), which means that the focus point is 120 pixels to the left and 100 pixels from the bottom State conversion type animation, describing conversion rules (gradual shifting, acceleration or rapid acceleration, gradual slowdown, or instant conversion). Animation describes conversion between frames (previous and current) that is displayed over the video. Animation can be presented in two ways: 1. an array of parameters that must be changed and the unit of time (or frame number) in which the change must be applied; 2. two coordinates between which the movement occurs, VV algorithm creates intermediate values FIG. 1 shows a situation where the user has expanded the video canvas to fit vertically, with part of the video being outside the viewzone (on left), and on right, where the video fits horizontally, but leaves some black space in the vertical direction. FIG. 2 shows a sample markup 18:9 device screen ratio. FIG. 3 shows the full frame (which is much larger than the device resolution), which is displayed in the form of a viewzone so that the vertical dimension matches the device, and parts of the viewzone in the horizontal direction extend beyond the device. The frame focus is located precisely in the center of the device screen. The device outline is approximate.

Figure 4:
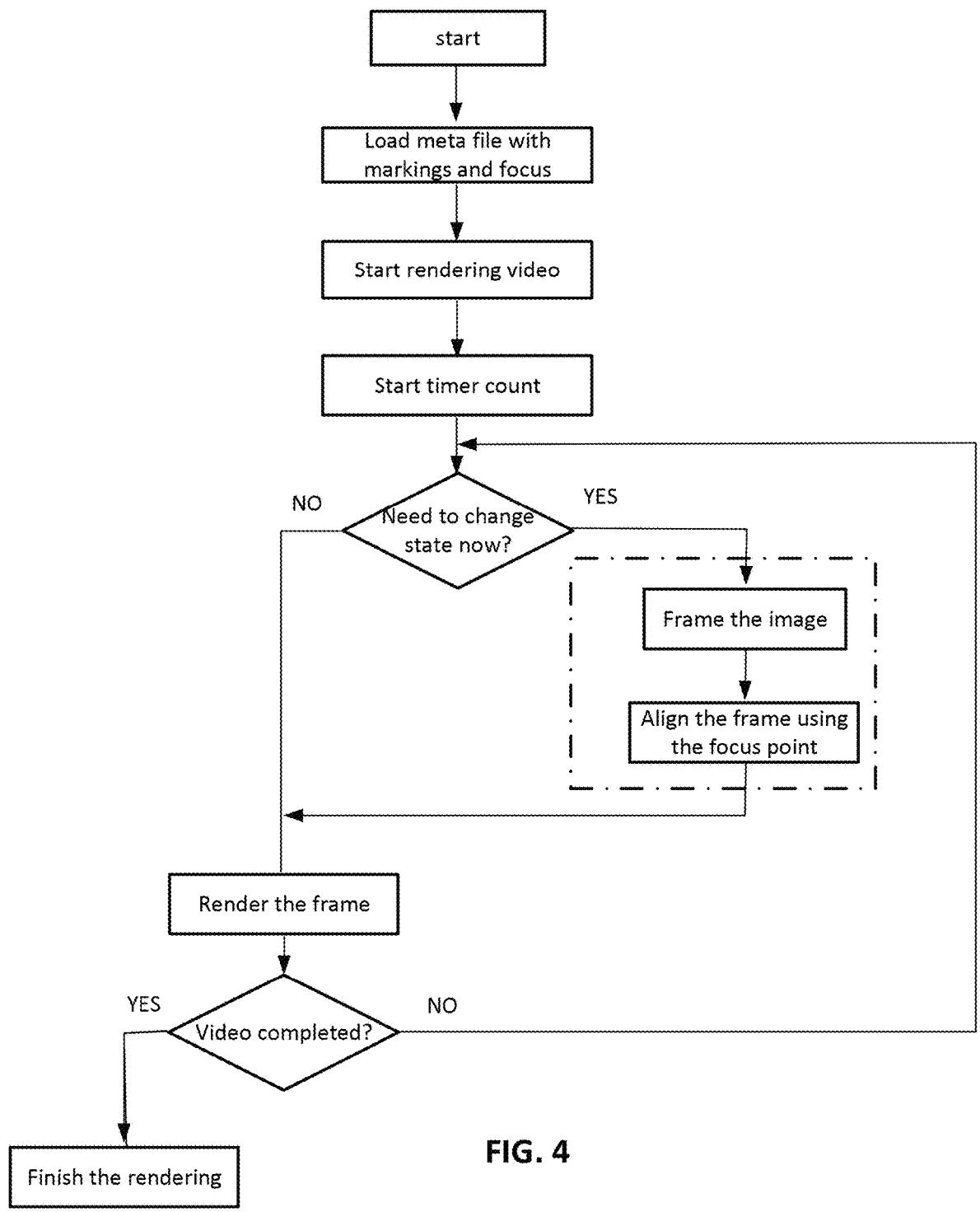
FIG. 4 illustrates a flow chart of the algorithm of the player.

FIG. 4 illustrates a flow chart of the algorithm of the player.

The player supports video playback in at least two modes: in mode 1, the frame is "fitted" into the screen, i.e., it is fully located inside the screen, and the extra space is filled with black; in mode 2, the frame is stretched by its longest side, while the remaining parts outside the screen are not shown. The mode may be set by the user (e.g., by pressing/touching the screen), or it may be a forced setting for a given video.

The video playback process is as follows:

On the user's screen, the video frame is stretched by the player by its longest side.

A timed algorithm controls position conversion.

During playback, when the frames are going to change, the video is displayed with non-visible edges that lay outside of the viewzone according to the ratio set in the markup, and then the resulting frame is positioned in the center of the user's screen using the focus dot. The dot is located precisely in the physical center of the device screen, and the frame is aligned with it.

At the moment of conversion, if the conversion animation is provided, the values are gradually (incrementally) changed into the given ones in accordance with the described algorithm.

Current implementation of the player is as follows:

Video and sound are played by streaming full-frame video from a server. Before the playback, the entire markup and frame focus file is loaded. The timed algorithm controls the time and gives instructions for conversion. Video streaming occurs as standard, at the same time, using an http request, a 4v file with a description of the format is obtained, and moreover, everything is done according to V algorithm.

The concepts described above are applicable to other effects as well. The proposed format supports a variety of extra effects and allows adding layers on top of the frames when the video is being played. The effects may be applied both to the video layer and over the sound track. Information about the effects is added to the metadata.

Since all effects are displayed in the player only, the original video is left unchanged. In order to utilize this technique, instructions containing the needed parameters are added to the verticalization file.

The "effects" tag that includes an array of effects being applied is added to the 0.4v metadata file. Each effect, in turn, has its own set of parameters, such as timecodes, type, etc.

A sample portion of the verticalization file that contains effects is as follows:

```
...
<effects>
    <effect type="effect type" time_start=23 time_end=233>
        <color replace="222,222,255" delta=23/>
    </effect>
</effects>
```

Figure 7:
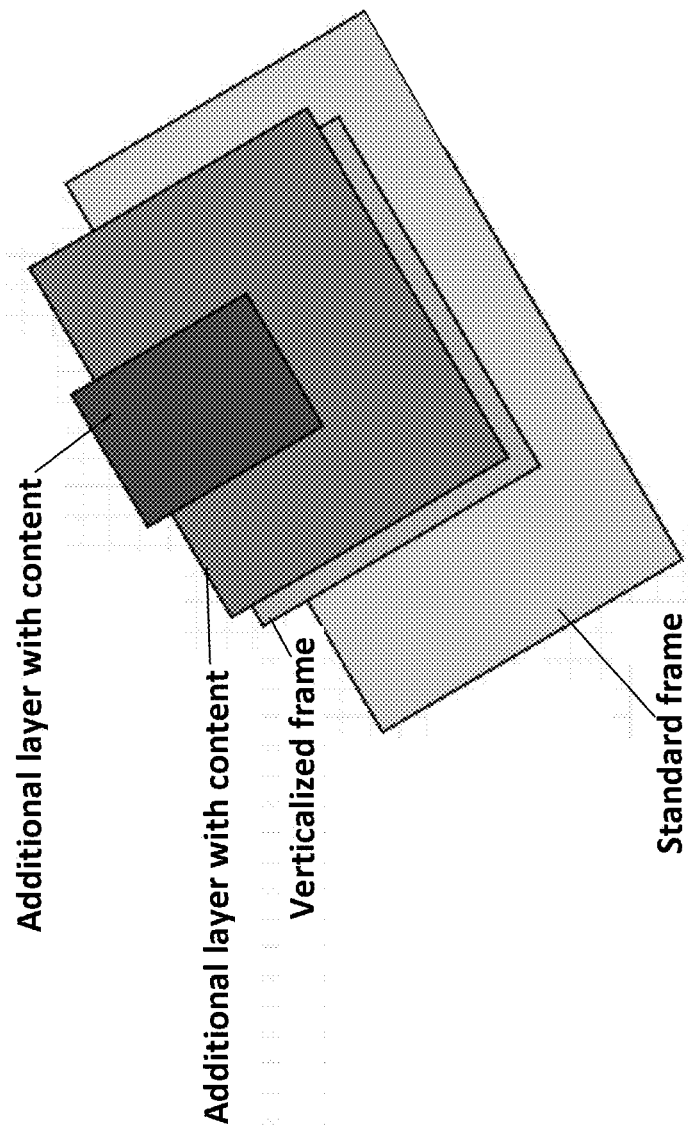
FIG. 7 shows the concept of layers of content.

Applying of the effects may be viewed as working with layers, see FIG. 7 showing the concept of layers. The base frame is not shown, the viewer sees a verticalized frame instead that is rendered on a separate layer. In case the effect involves simple frame distortion, it is applied directly to the verticalized frame layer. In case the effect requires additional content to be added or some modifications to be done on a separate layer, a new layer is created and displayed over the verticalized frame layer.

Below are sample effects included into the basic player. By operating layers and parameter sets detailed below, it is possible to create new effects that would have to be just loaded into the player and described in a new version of the verticalization data. This would enable users to create any distortions or modifications layers on top of the video, which they can see during playback, or otherwise manipulate display of the video frames in real time.

1. Chromakey

This effect allows to add a layer with a different video background, e.g., with a color, still image or another video. In other words, the layer is a canvas, on which anything can be drawn. It has the following parameters:

Replace—defining the pixel position of the color that is assumed to be a background color and adding different color of that pixel on the layer displaying over the video; and Delta—defining the tolerance level for the pixel position.

A separate tag is used to define the content and place text layer on top of the video to display for user the replaced selected text (IMG=path to a still image; VIDEO=path to a video file; or COLOR=new color).

```
...
<effects>
    <effect type="chromakey" time_start=1000 time_end=2000>
        <base replace="0,222,0" delta=23/>
        <content img="localpath.png"/>
            or
        <content video="localpath.mp4"/>
            or
        <content color= "34,34,123"/>
    </effect>
</effects>
...
```

2. Sound Effects

The sound track can also be manipulated using the approach described herein, by adding an additional soundtrack to the existing one. The user may either apply an effect to the original sound track or in some cases replace it with a different one. Typically, another audio stream is created (it has its own parameters in terms of volume and other parameters, for example, and outputted to one of the channels). The following exemplary sound effects are available:

LOW PASS EFFECT

Cutoff freq—Low pass frequency filter cutoff frequency, in Hz (range 10.0 to 22000.0, default=5000.0).

Resonance—Low pass frequency filter resonance quality (range 1.0 to 10.0, default=1.0).

HIGH PASS EFFECT

Cutoff freq—High pass frequency filter cutoff frequency, in Hz (range 10.0 to 22000.0, default=5000.0).

Resonance—High pass frequency filter resonance quality (range 1.0 to 10.0, default=1.0).

These two effects are low frequency filter and high frequency filter correspondingly. Their main parameter is cutoff freq(uency), in Hz.

ECHO EFFECT

Adds echo to the sound track, that is described by the following parameters: delay—to define the echo delay, in msec, ranging from 10 to 5000; and decay—to define the echo decay, ranging from 0 to 1, where 1 is no decay, and 0 is full decay. The parameters are:

Delay—Echo delay, in msec (range 10 to 5000, default=500).

Decay—Echo decay per delay. 0 to 100%. 100%=No decay, 0%=total decay (i.e. simple 1 line delay). Default=50%.

Max Channels

Drymix—Volume of original signal to pass to output. 0 to 100%. Default=100%.

Wetmix—Volume of echo signal to pass to output. 0 to 100%. Default=100%.

FLANGE EFFECT

Adds a flange that is described by the following parameters: Drymix (original sound percentage), Wetmix (flange percentage), and Rate—frequency ranging from 0.1 to 20 Hz. The parameters are:

Drymix—Percentage of original signal to pass to output. 0.0 to 100.0%. Default=45%.

Wetmix—Percentage of flange signal to pass to output. 0.0 to 100.0%. Default=55%.

Depth—0.01 to 1.0. Default=1.0.

Rate—0.1 to 20 Hz. Default=10 Hz.

DISTORTION EFFECT

Adds distortion layer that is described by the Distortion parameter ranging from 0 to 1, default=0.5.

PITCH

Adds a pitch shift that is described by the following parameters: pitch—multiplier, ranging from 0.5 to 2.0; and FFT size—ranging from 256.0 to 4096.0.

These are sample effects that can be integrated into the basic player. The underlying technology also supports other effects which can be applied to a video by adding them into the .XML verticalization file.

3. Frame Proportions

Frames can be distorted algorithmically, wherein the layer can be cropped or resized in real time, based on the defined parameters. These effects will be removed after the video ends.

The parameters of these effects take the following arguments: X and Y, which define frame position relative to the center of the screen; W and H, which define frame width and height. Also, the CROP tag can be added to define the crop margins of the layer: left (L), right (R), top (T), and bottom (B).

4. Complex Frames

Figure 8:
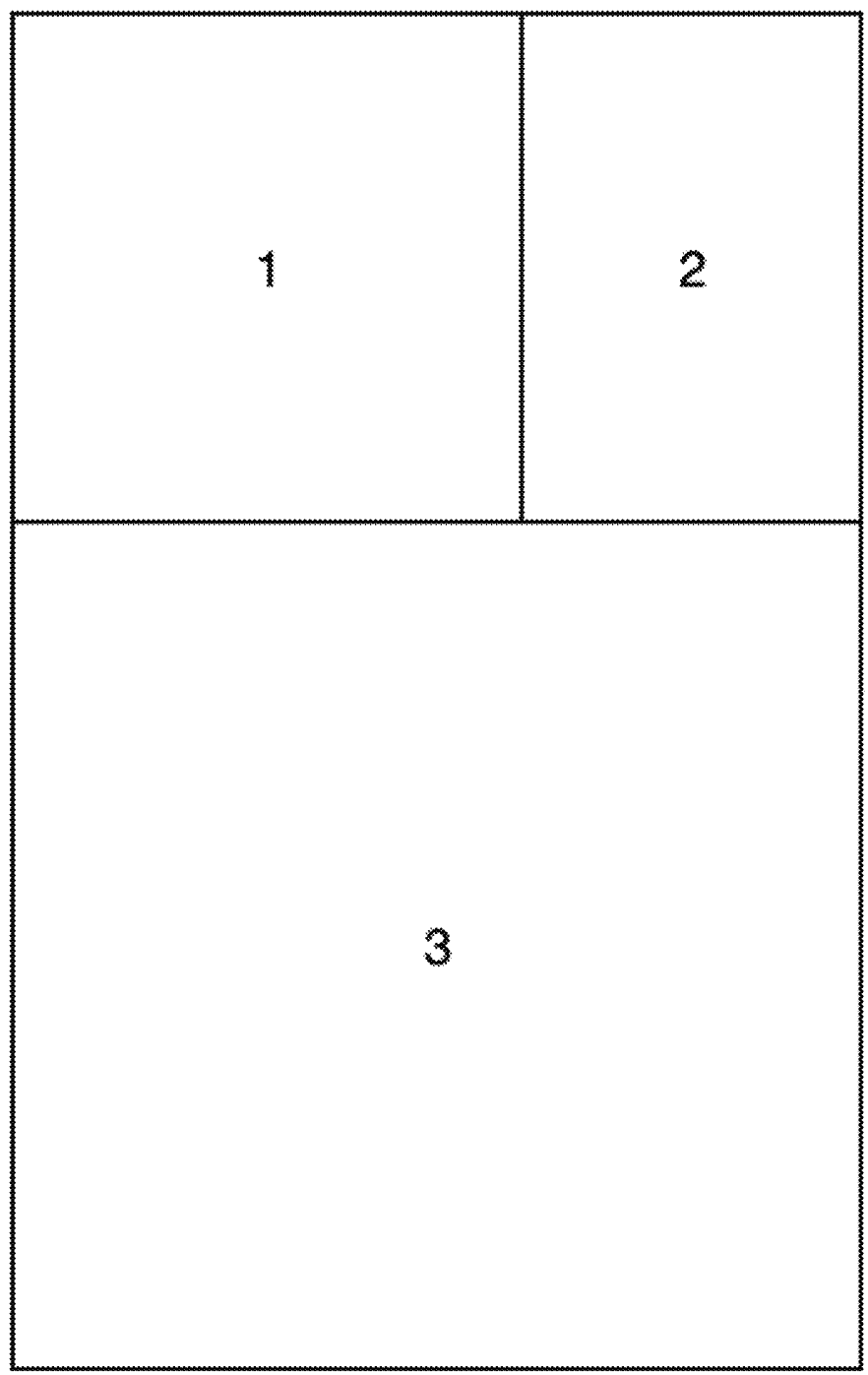
FIG. 8 shows how a frame can be divided into fragments.

In order to preserve the essence of the frame, it can be divided into fragments to be displayed on different parts of the screen, see 1, 2, 3 in FIG. 8. This effect turns the user's device into the multiscreen mode, where several fragments of the original frame are displayed at the same time:

. . .
```
<effects>
    <effect type="splitscren" time_start=1000 time_end=2000>
        <content index="1" pos="0.3,0.5" crop="0.1,0.1,0.1,0.1"/>
        <content index="2" pos="0.3,0.5" crop="0.1,0.1,0.1,0.1"/>
        <content index="3" pos="0.3,0.5" crop="0.1,0.1,0.1,0.1"/>
        <screen index="1" pos="0.0,0.5" size="0.5,0.5"/>
        <screen index="2" pos="0.0,0.0" size="0.1,0.5"/>
        <screen index="3" pos="0.1,0.8" size="0.9,0.2"/></effect>
</effects>
```
. . .

For example, the user's screen can be divided into three parts, each part showing a different fragment of the original frame.

These screen parts are defined by the following parameters:

index—the unique screen ID used to match the fragment with its associated screen part.

pos—the location and positioning of the virtual screen on the user's device, which is defined relative to the actual screen size (e.g. virtual screen width 0.1 equals 10% of the actual device screen width).

size—the size of the virtual screen, relative to the actual screen size.

The screen contents are defined by the following parameters:

Index—the link to the screen part that will display the fragment; pos—the starting position of the fragment; crop—the size of the fragment.

The screens can be laid over each other, but in this case each screen will be rendered according to its index, i.e. index 1 screen will be covered by index 5 screen.

5. Layers

Additional layers may hold outside content, such as still images, video, or text, that can be used to add titles or to change the viewing experience of the original video due to the added layers.

Normalize Effect

Fade in time—Fade in time of the effect in seconds (range 0 to 20000.0, default=5000.0 seconds).

Lowest volume—(range 0.0 to 1.0, default=0.10).

Maximum amp—Maximum amplification (range 20.0 to 100000.0, default=20×).

Parametric Equalizer Effect

Center freq—The frequency in Hertz where the gain is applied (range 20.0 to 22000.0, default=8000.0 Hz). Octave Range—The number of Octaves over which the gain is applied (Centered on the Center Frequency) (range 0.20 to 5.00, default=1.0 octave).

Frequency Gain—The gain applied (range 0.05 to 3.00, default=1.00—no gain applied).

Pitch Shifter Effect

Pitch—The pitch multiplier (range 0.5× to 2.0×, default 1.0×).

FFT Size—(range 256.0 to 4096.0, default=1024.0).

Overlap—(range 1 to 32, default=4).

Max channels—The maximum number of channels (range 0 to 16, default=0 channels).

Frame Proportions (Crop,Resize)

A frame can seem distorted in real time by modifying (e.g. cropping) the verticalized frame layer according to the parameters of the selected effect.

```
{
    "effect": {                            - - video effect description
        "type": "crop", ИЛИ resize)        - - effect type
        "time_start": 3,                   - - trim beginning timecode
        "time_finish": 6,                  - - trim ending timecode
        "time_dest": 12                    - - insertion timecode
        "x": 0,                            - - frame location relative to X axis
        "y": 0,                            - - frame location relative to Y axis
        "w": 1,                            - - frame width
        "h": 0.5,                          - - frame height
    }
}
```

Complex Frame

The complex frame effect can be used for verticalization to show several parts of the same frame or different frames at the same time. For instance, a dialogue between two characters can be shown on a single screen, where one part of the frame is displayed in the upper half of the screen, while the other part of the frame is displayed in the lower half of the screen.

Replace background
```
{
    "effect": {                            - - video effect description
        "type": "chromakey",               - - effect type
        "time_start": 3,                   - - trim beginning timecode
        "time_finish": 6,                  - - trim ending timecode
        "sound_effect": "color"
        "color": "255.12,23"
        "delta":                                            ".2"
}
```
Apply additional sound in the player (i.e., play sound effects) (tone, frequency)
The verticalization format may also contain sound parameters.
```
{
    "effect": {                            - - video effect description
        "type": "crop", (ИЛИ resize)       - - effect type
        "time_start": 3,                   - - trim beginning timecode
        "time_finish": 6,                  -- trim ending timecode
        "sound_effect": "low_pass_freq"
        "cutoffreq": "10.2",
        "resonanse": "3"
}
```

```
{
    "effect": {                     - - video effect description
        "type": "complex",          - - effect type
        "time_start": 3,            - - trim beginning timecode
        "time_finish": 6,           - - trim ending timecode
        "time_dest": 12             - - insertion timecode
        "fromx": 0,                 - - frame position relative to X axis
        "fromy": 0,                 - - frame position relative to Y axis
        "fromw": 1,                 - - frame width
        "fromh": 0.5,               - - frame height
        "tox": 0.3,                 - - frame position relative to X axis
        "toy": .3,                  - - frame position relative to Y axis
        "tow": .5,                  - - frame width
        "toh": .2,                  - - frame height
}
```

Cutting or splicing portions of the film: showing only some parts of the video frames in real time using the trim effect, as follows:

```
{
    "effect": {                     - - video effect description
        "type": "trim",             - - effect type
        "time_start": 3,            - - trim beginning timecode
        "time_finish": 6,           - - trim ending timecode
        "time_dest": 12             - - insertion timecode
    }
}
```

Additional Layer/Mask

Video may be overlaid with additional content layers that may cover the verticalized video either entirely.

The additional layers may be both video feeds and still images. Still images may have an alpha channel. Video feeds may have their background overlayed by mask or color.

The verticalization format may contain descriptions of the layers, along with their timecodes.

```
{
    "effect": {                     - - video effect description
        "type": "layer",            - - effect type
        "time_start": 3,            - - beginning timecode
        "time_finish": 6,           - - ending timecode
        "layer": {                  - - layer description
        {
            "name": "layer1",       - - layer name
            "x": 0,                 - - position relative to X axis
            "y": 0.2,               - - position relative to Y axis
            "w": 1,                 - - layer width
            "h": 0.5,               - - layer height
            "type": "video",        - - video type
            "path": ".../video.mp4" - - path to the video
        },
        {
            "name": "layer2",
            "x": 0,
            "y": 0,
            "w": 1,
            "h": 1,
            "type": "image",        - - photo image type
            "alpha": "255,12,122",  - - transparent color
            (alpha channel)
            "path":". . ./img.png"
        }
    }
  }
}
```

Figure 5:
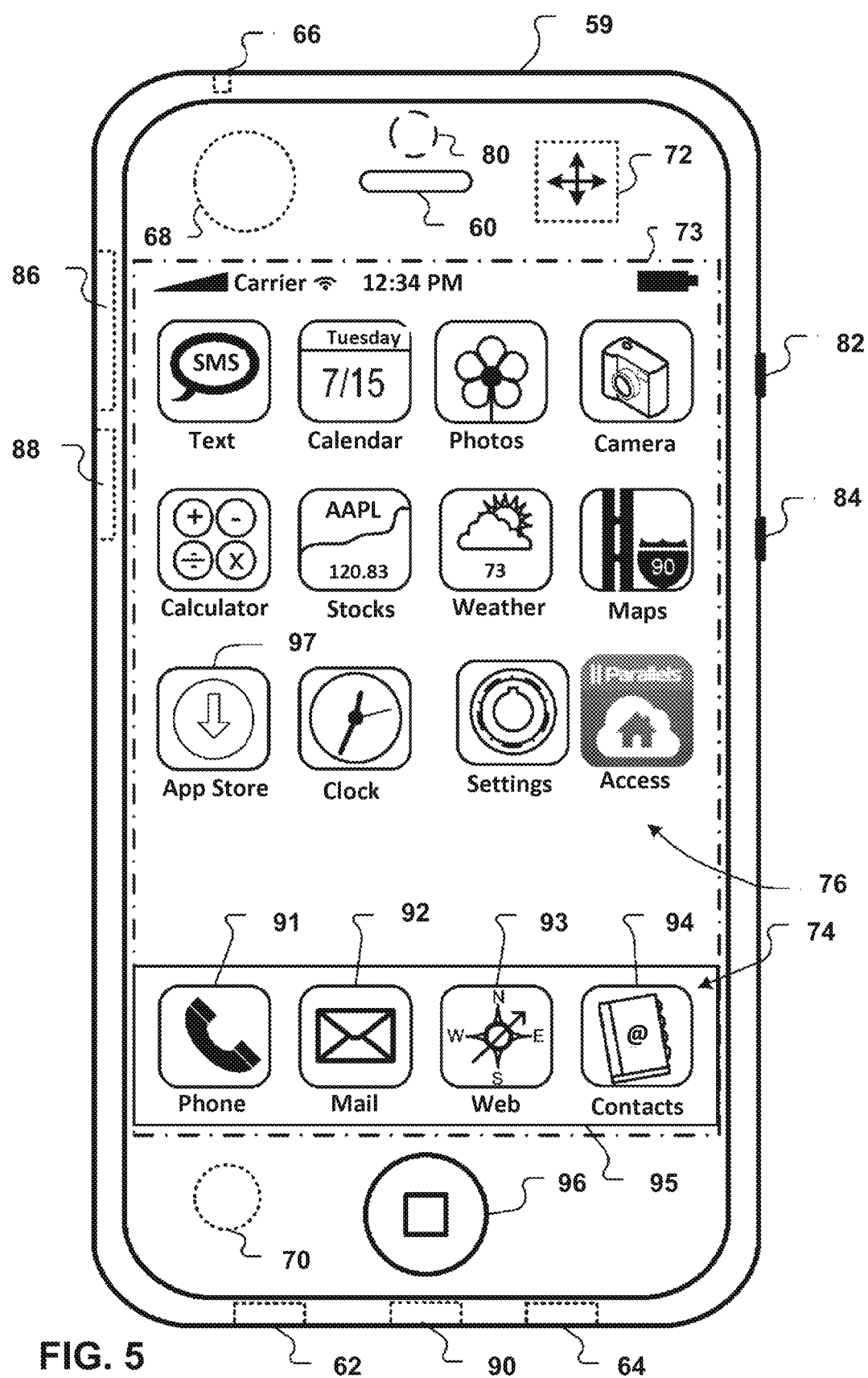
FIG. 5 is a block diagram of an exemplary mobile device that can be used in the invention.

FIG. 5 is a block diagram of an exemplary mobile device 59 on which the invention can be implemented. The mobile device 59 can be, for example, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

In some implementations, the mobile device 59 includes a touch-sensitive display 73. The touch-sensitive display 73 can implement liquid crystal display (LCD) technology, light emitting polymer display (LPD) technology, or some other display technology. The touch-sensitive display 73 can be sensitive to haptic and/or tactile contact with a user.

In some implementations, the touch-sensitive display 73 can comprise a multi-touch-sensitive display 73. A multi-touch-sensitive display 73 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device.

In some implementations, the mobile device 59 can display one or more graphical user interfaces on the touch-sensitive display 73 for providing the user access to various system objects and for conveying information to the user. In some implementations, the graphical user interface can include one or more display objects 74, 76. In the example shown, the display objects 74, 76, are graphic representations of system objects. Some examples of system objects include device functions, applications, windows, files, alerts, events, or other identifiable system objects.

In some implementations, the mobile device 59 can implement multiple device functionalities, such as a telephony device, as indicated by a phone object 91; an e-mail device, as indicated by the e-mail object 92; a network data communication device, as indicated by the Web object 93; a Wi-Fi base station device (not shown); and a media processing device, as indicated by the media player object 94. In some implementations, particular display objects 74, e.g., the phone object 91, the e-mail object 92, the Web object 93, and the media player object 94, can be displayed in a menu bar 95. In some implementations, device functionalities can be accessed from a top-level graphical user interface, such as the graphical user interface illustrated in the figure. Touching one of the objects 91, 92, 93 or 94 can, for example, invoke corresponding functionality.

In some implementations, the mobile device 59 can implement network distribution functionality. For example, the functionality can enable the user to take the mobile device 59 and its associated network while traveling. In particular, the mobile device 59 can extend Internet access (e.g., Wi-Fi) to other wireless devices in the vicinity. For example, mobile device 59 can be configured as a base station for one or more devices. As such, mobile device 59 can grant or deny network access to other wireless devices.

In some implementations, upon invocation of device functionality, the graphical user interface of the mobile device 59 changes, or is augmented or replaced with another user interface or user interface elements, to facilitate user access to particular functions associated with the corresponding device functionality. For example, in response to a user touching the phone object 91, the graphical user interface of the touch-sensitive display 73 may present display objects related to various phone functions; likewise, touching of the email object 92 may cause the graphical user interface to present display objects related to various e-mail functions; touching the Web object 93 may cause the graphical user interface to present display objects related to various Web-surfing functions; and touching the media player object 94 may cause the graphical user interface to present display objects related to various media processing functions.

In some implementations, the top-level graphical user interface environment or state can be restored by pressing a button 96 located near the bottom of the mobile device 59. In some implementations, each corresponding device functionality may have corresponding "home" display objects displayed on the touch-sensitive display 73, and the graphical user interface environment can be restored by pressing the "home" display object.

In some implementations, the top-level graphical user interface can include additional display objects 76, such as a short messaging service (SMS) object, a calendar object, a photos object, a camera object, a calculator object, a stocks object, a weather object, a maps object, a notes object, a clock object, an address book object, a settings object, and an app store object 97. Touching the SMS display object can, for example, invoke an SMS messaging environment and supporting functionality; likewise, each selection of a display object can invoke a corresponding object environment and functionality.

Additional and/or different display objects can also be displayed in the graphical user interface. For example, if the device 59 is functioning as a base station for other devices, one or more "connection" objects may appear in the graphical user interface to indicate the connection. In some implementations, the display objects 76 can be configured by a user, e.g., a user may specify which display objects 76 are displayed, and/or may download additional applications or other software that provides other functionalities and corresponding display objects.

In some implementations, the mobile device 59 can include one or more input/output (I/O) devices and/or sensor devices. For example, a speaker 60 and a microphone 62 can be included to facilitate voice-enabled functionalities, such as phone and voice mail functions. In some implementations, an up/down button 84 for volume control of the speaker 60 and the microphone 62 can be included. The mobile device 59 can also include an on/off button 82 for a ring indicator of incoming phone calls. In some implementations, a loud speaker 64 can be included to facilitate hands-free voice functionalities, such as speaker phone functions. An audio jack 66 can also be included for use of headphones and/or a microphone.

In some implementations, a proximity sensor 68 can be included to facilitate the detection of the user positioning the mobile device 59 proximate to the user's ear and, in response, to disengage the touch-sensitive display 73 to prevent accidental function invocations. In some implementations, the touch-sensitive display 73 can be turned off to conserve additional power when the mobile device 59 is proximate to the user's ear.

Other sensors can also be used. For example, in some implementations, an ambient light sensor 70 can be utilized to facilitate adjusting the brightness of the touch-sensitive display 73. In some implementations, an accelerometer 72 can be utilized to detect movement of the mobile device 59, as indicated by the directional arrows. Accordingly, display objects and/or media can be presented according to a detected orientation, e.g., portrait or landscape. In some implementations, the mobile device 59 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 59 or provided as a separate device that can be coupled to the mobile device 59 through an interface (e.g., port device 90) to provide access to location-based services.

The mobile device 59 can also include a camera lens and sensor 80. In some implementations, the camera lens and sensor 80 can be located on the back surface of the mobile device 59. The camera can capture still images and/or video.

The mobile device 59 can also include one or more wireless communication subsystems, such as an 802.11b/g communication device 86, and/or a BLUETOOTH communication device 88. Other communication protocols can also be supported, including other 802.x communication protocols (e.g., WiMax, Wi-Fi, 3G, LTE), code division multiple access (CDMA), global system for mobile communications (GSM), Enhanced Data GSM Environment (EDGE), etc.

In some implementations, the port device 90, e.g., a Universal Serial Bus (USB) port, or a docking port, or some other wired port connection, is included. The port device 90 can, for example, be utilized to establish a wired connection to other computing devices, such as other communication devices 59, network access devices, a personal computer, a printer, or other processing devices capable of receiving and/or transmitting data. In some implementations, the port device 90 allows the mobile device 59 to synchronize with a host device using one or more protocols, such as, for example, the TCP/IP, HTTP, UDP and any other known protocol. In some implementations, a TCP/IP over USB protocol can be used.

Figure 6:
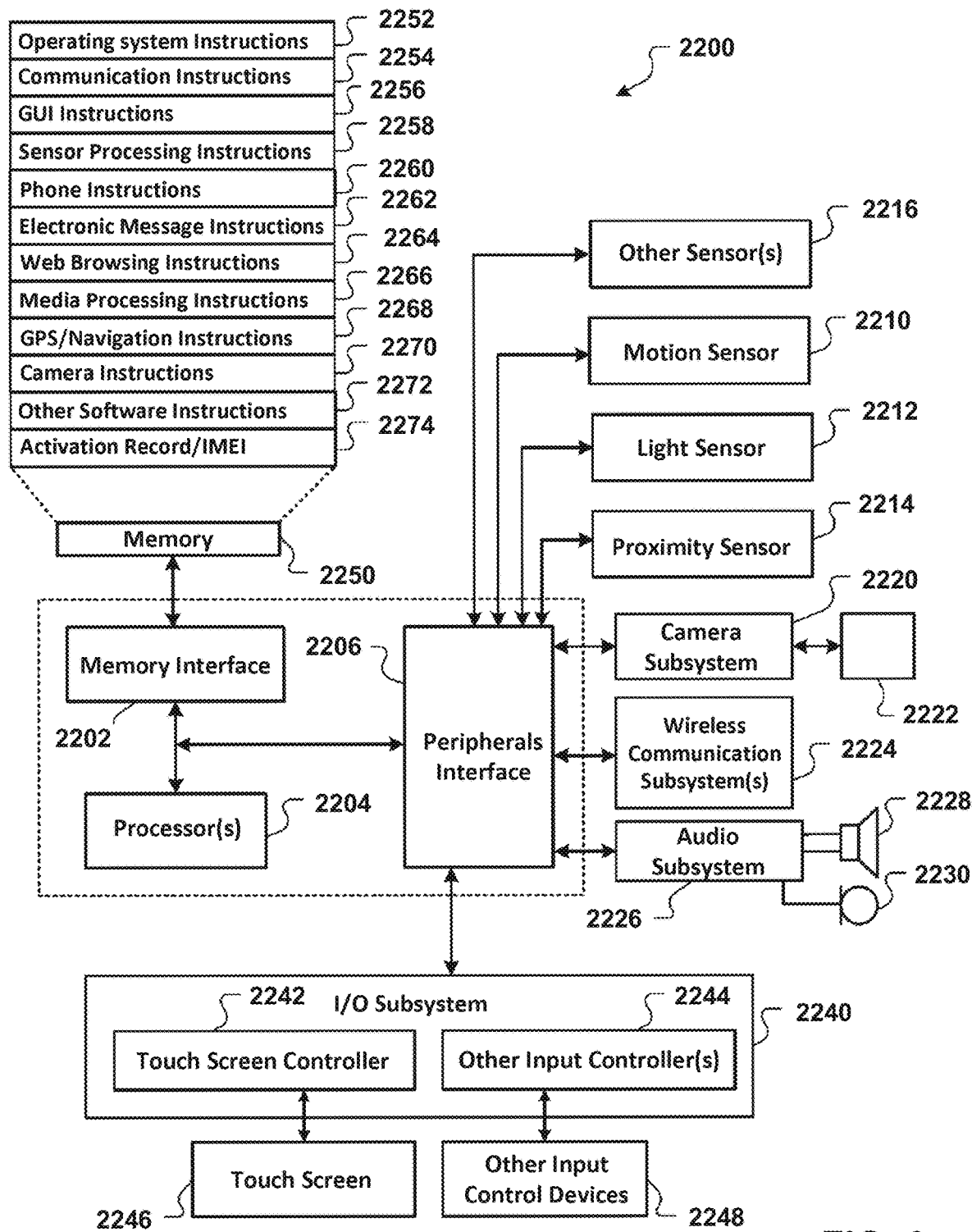
FIG. 6 is a block diagram of an exemplary implementation of the mobile device.

FIG. 6 is a block diagram 2200 of an example implementation of the mobile device 59. The mobile device 59 can include a memory interface 2202, one or more data processors, image processors and/or central processing units 2204, and a peripherals interface 2206. The memory interface 2202, the one or more processors 2204 and/or the peripherals interface 2206 can be separate components or can be integrated in one or more integrated circuits. The various components in the mobile device 59 can be coupled by one or more communication buses or signal lines.

Sensors, devices and subsystems can be coupled to the peripherals interface 2206 to facilitate multiple functionalities. For example, a motion sensor 2210, a light sensor 2212, and a proximity sensor 2214 can be coupled to the peripherals interface 2206 to facilitate the orientation, lighting and proximity functions described above. Other sensors 2216 can also be connected to the peripherals interface 2206, such as a positioning system (e.g., GPS receiver), a temperature sensor, a biometric sensor, or other sensing device, to facilitate related functionalities.

A camera subsystem 2220 and an optical sensor 2222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 2224, which can include radio frequency receivers and transmitters and/or optical (e.g., infrared) receivers and transmitters. The specific design and implementation of the communication subsystem 2224 can depend on the communication network(s) over which the mobile device 59 is intended to operate. For example, a mobile device 59 may include communication subsystems 2224 designed to operate over a GSM network, a GPRS network, an EDGE network, a Wi-Fi or WiMax network, and a BLUETOOTH network. In particular, the wireless communication subsystems 2224 may include hosting protocols such that the device 59 may be configured as a base station for other wireless devices.

An audio subsystem 2226 can be coupled to a speaker 2228 and a microphone 2230 to facilitate voice-enabled functions, such as voice recognition, voice replication, digital recording, and telephony functions.

The I/O subsystem 2240 can include a touch screen controller 2242 and/or other input controller(s) 2244. The touch-screen controller 2242 can be coupled to a touch screen 2246. The touch screen 2246 and touch screen controller 2242 can, for example, detect contact and movement or break thereof using any of multiple touch sensitivity technologies, including but not limited to capacitive, resistive, infrared, and surface acoustic wave technologies, as well as other proximity sensor arrays or other elements for determining one or more points of contact with the touch screen 2246.

The other input controller(s) 2244 can be coupled to other input/control devices 2248, such as one or more buttons, rocker switches, thumb-wheel, infrared port, USB port, and/or a pointer device such as a stylus. The one or more buttons (not shown) can include an up/down button for volume control of the speaker 2228 and/or the microphone 2230.

In one implementation, a pressing of the button for a first duration may disengage a lock of the touch screen 2246; and a pressing of the button for a second duration that is longer than the first duration may turn power to the mobile device 59 on or off. The user may be able to customize a functionality of one or more of the buttons. The touch screen 2246 can, for example, also be used to implement virtual or soft buttons and/or a keyboard.

In some implementations, the mobile device 59 can present recorded audio and/or video files, such as MP3, AAC, and MPEG files. In some implementations, the mobile device 59 can include the functionality of an MP3 player. The mobile device 59 may, therefore, include a 32-pin connector that is compatible with the MP3 player. Other input/output and control devices can also be used.

The memory interface 2202 can be coupled to memory 2250. The memory 2250 can include high-speed random access memory and/or non-volatile memory, such as one or more magnetic disk storage devices, one or more optical storage devices, and/or flash memory (e.g., NAND, NOR). The memory 2250 can store an operating system 2252, such as Darwin, RTXC, LINUX, UNIX, OS X, ANDROID, IOS, WINDOWS, or an embedded operating system such as VxWorks. The operating system 2252 may include instructions for handling basic system services and for performing hardware dependent tasks. In some implementations, the operating system 2252 can be a kernel (e.g., UNIX kernel).

The memory 2250 may also store communication instructions 2254 to facilitate communicating with one or more additional devices, one or more computers and/or one or more servers. The memory 2250 may include graphical user interface instructions 2256 to facilitate graphic user interface processing including presentation, navigation, and selection within an application store; sensor processing instructions 2258 to facilitate sensor-related processing and functions; phone instructions 2260 to facilitate phone-related processes and functions; electronic messaging instructions 2262 to facilitate electronic-messaging related processes and functions; web browsing instructions 2264 to facilitate web browsing-related processes and functions; media processing instructions 2266 to facilitate media processing-related processes and functions; GPS/Navigation instructions 2268 to facilitate GPS and navigation-related processes and instructions; camera instructions 2270 to facilitate camera-related processes and functions; and/or other software instructions 2272 to facilitate other processes and functions.

Each of the above identified instructions and applications can correspond to a set of instructions for performing one or more functions described above. These instructions need not be implemented as separate software programs, procedures or modules. The memory 2250 can include additional instructions or fewer instructions. Furthermore, various functions of the mobile device 59 may be implemented in hardware and/or in software, including in one or more signal processing and/or application specific integrated circuits.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A method for playing video in a format that matches a user device, the method comprising:
    loading a video into a player;
    checking if the video contains metadata specifying resolution and crop parameters that matches the particular user device;
    if the metadata is found, then
    (i) taking a frame from the video and define a focus point in a center of the frame;
    (ii) defining a viewzone based on the frame and reducing or enlarging the video resolution inside the viewzone based on the metadata;
    (iii) displaying the viewzone so that a vertical dimension of the viewzone matches a vertical dimension of the user device, and the focus point remains in the center of the viewzone and in the center of the user device;
    (iv) upon user rotation of the user device, re-displaying the frame such that the focus point remains in the center of the device, and a horizontal dimension of the viewzone matches a horizontal dimension of the user device, and portions of the screen above and below the viewzone are rendered black; and
    (v) continuing rendering subsequent frames of the video, layers, and/or effects according to (i)-(iv),
    wherein the player detects resolution changes in the user device due to rotation, and sets the video, layers, and effects rendering into a vertical or horizontal mode, and
    wherein the effects include any of defining additional layers over the frame, displaying a layer over with a color, still image or another video that matches background of the original video, a low pass sound effect, high pass sound effect, audio equalizer effect, pitch effect, distortion effect, flange effect, resonance effect and echo effect.

2. The method of claim 1, wherein a user inputs left margin, right margin, top margin, bottom margin, time code and/or frame number, as the metadata or data.

3. The method of claim 1, wherein a user uses a software tool to visually define the area to be displayed.

4. The method of claim 1, wherein a user defines parameter values associated with the frame that are the same as parameter values associated with a previous frame.

5. The method of claim 1, wherein the metadata is structured as XML or JSON.

6. The method of claim 1, wherein the user device is any of a smartphone, tablet, a desktop computer, and a TV set.

7. The method of claim 1, wherein the player detects device rotation, and displays the video in either enlarged, reduced or original resolution inside the viewzone, depending on the device screen resolution (either vertical or horizontal).

8. The method of claim 1, further comprising expanding or shrinking each viewzone or the entire video to fit it into a player canvas.

9. The method of claim 1, wherein the player supports two playback regimes:
(1) the frame fully fits within the screen, and any marginal space is rendered in black, and (2) the frame is stretched along a maximum dimension, and a remainder of the frame is outside the screen, and
wherein the playback regime is set by the user.

10. The method of claim 1, wherein the player supports two playback regimes:
(1) the frame fully fits within the screen, and any marginal space is rendered in black, and (2) the frame is stretched along a maximum dimension, and a remainder of the frame is outside the screen, and
wherein the playback regime is set by the metadata or data.

11. A method for playing video in a format that matches a user device, the method comprising:
loading a video into a player;
checking if the video contains metadata specifying resolution and crop parameters that matches the particular user device;
if the metadata is found, then
(i) taking a frame from the video and define a focus point in a center of the frame;
(ii) defining a viewzone based on the frame and reducing or enlarging the video resolution inside the viewzone based on the metadata;
(iii) displaying the viewzone so that a vertical dimension of the viewzone matches a vertical dimension of the user device, and the focus point remains in the center of the viewzone and in the center of the user device;
(iv) upon user rotation of the user device, re-displaying the frame such that the focus point remains in the center of the device, and a horizontal dimension of the viewzone matches a horizontal dimension of the user device, and portions of the screen above and below the viewzone are rendered black; and
(v) continuing rendering subsequent frames of the video, layers, and/or effects according to (i)-(iv),
wherein areas in the video are defined based on a context and differences in pixel positions between frames, and
wherein a focus point is defined based on a most pronounced pixel shift in the frame.

12. A method for playing video in a format that matches a user device, the method comprising:
loading a video into a player;
checking if the video contains metadata specifying resolution and crop parameters that matches the particular user device;
if the metadata is found, then
(i) taking a frame from the video and define a focus point in a center of the frame;
(ii) defining a viewzone based on the frame and reducing or enlarging the video resolution inside the viewzone based on the metadata;
(iii) displaying the viewzone so that a vertical dimension of the viewzone matches a vertical dimension of the user device, and the focus point remains in the center of the viewzone and in the center of the user device;
(iv) upon user rotation of the user device, re-displaying the frame such that the focus point remains in the center of the device, and a horizontal dimension of the viewzone matches a horizontal dimension of the user device, and portions of the screen above and below the viewzone are rendered black; and
(v) continuing rendering subsequent frames of the video, layers, and/or effects according to (i)-(iv),
wherein in response to a user moving the user device, the displayed area shifts in a given direction, similar to 360° videos.

13. A method for playing video in a format that matches a user device, the method comprising:
loading a video into a player;
checking if the video contains metadata specifying resolution and crop parameters that matches the particular user device;
if the metadata is found, then
(i) taking a frame from the video and define a focus point in a center of the frame;
(ii) defining a viewzone based on the frame and reducing or enlarging the video resolution inside the viewzone based on the metadata;
(iii) displaying the viewzone so that a vertical dimension of the viewzone matches a vertical dimension of the user device, and the focus point remains in the center of the viewzone and in the center of the user device;
(iv) upon user rotation of the user device, re-displaying the frame such that the focus point remains in the center of the device, and a horizontal dimension of the viewzone matches a horizontal dimension of the user device, and portions of the screen above and below the viewzone are rendered black; and
(v) continuing rendering subsequent frames of the video, layers, and/or effects according to (i)-(iv),
wherein a timer is used to rotate the frame and the crop parameters.

14. A method for playing video in a format that matches a user device, the method comprising:
loading a video into a player;
checking if the video contains metadata specifying resolution and crop parameters that matches the particular user device;
if the metadata is found, then
(i) taking a frame from the video and define a focus point in a center of the frame;
(ii) defining a viewzone based on the frame and reducing or enlarging the video resolution inside the viewzone based on the metadata;
(iii) displaying the viewzone so that a vertical dimension of the viewzone matches a vertical dimension of the user device, and the focus point remains in the center of the viewzone and in the center of the user device;
(iv) upon user rotation of the user device, re-displaying the frame such that the focus point remains in the center of the device, and a horizontal dimension of the viewzone matches a horizontal dimension of the user device, and portions of the screen above and below the viewzone are rendered black; and
(v) continuing rendering subsequent frames of the video, layers, and/or effects according to (i)-(iv),
wherein the effects include any of defining additional layers over the frame, displaying a layer over with a color, still image or another video that matches background of the original video, a low pass sound effect, high pass sound effect, audio equalizer effect, pitch effect, distortion effect, flange effect, resonance effect and echo effect, and wherein a rotation of the device results in a gradual and smooth change of the parameters from a first set to a second set.

15. A method for playing video in a format that matches a user device, the method comprising:

loading a video into a player;

checking if the video contains metadata specifying resolution and crop parameters that matches the particular user device;

if the metadata is found, then (i) taking a frame from the video and define a focus point in a center of the frame;

(ii) defining a viewzone based on the frame and reducing or enlarging the video resolution inside the viewzone based on the metadata;

(iii) displaying the viewzone so that a vertical dimension of the viewzone matches a vertical dimension of the user device, and the focus point remains in the center of the viewzone and in the center of the user device;

(iv) upon user rotation of the user device, re-displaying the frame such that the focus point remains in the center of the device, and a horizontal dimension of the viewzone matches a horizontal dimension of the user device, and portions of the screen above and below the viewzone are rendered black; and (v) continuing rendering subsequent frames of the video, layers, and/or effects according to (i)-(iv), wherein the metadata includes an "effects" tag specifying effects and their parameters, and wherein an application of the "effects" includes defining additional layers over the frame with the effects.

16. A method for playing video in a format that matches a user device, the method comprising:

loading a video into a player;

checking if the video contains metadata specifying resolution and crop parameters that matches the particular user device;

if the metadata is found, then (i) taking a frame from the video and define a focus point in a center of the frame;

(ii) defining a viewzone based on the frame and reducing or enlarging the video resolution inside the viewzone based on the metadata;

(iii) displaying the viewzone so that a vertical dimension of the viewzone matches a vertical dimension of the user device, and the focus point remains in the center of the viewzone and in the center of the user device;

(iv) upon user rotation of the user device, re-displaying the frame such that the focus point remains in the center of the device, and a horizontal dimension of the viewzone matches a horizontal dimension of the user device, and portions of the screen above and below the viewzone are rendered black; and (v) continuing rendering subsequent frames of the video, layers, and/or effects according to (i)-(iv), wherein the metadata includes an "effects" tag specifying effects and their parameters, and wherein the "effects" include displaying a layer over with a color, still image or another video that matches background of the original video.

17. A method for playing video in a format that matches a user device, the method comprising:

loading a video into a player;

checking if the video contains metadata specifying resolution and crop parameters that matches the particular user device;

if the metadata is found, then (i) taking a frame from the video and define a focus point in a center of the frame;

(ii) defining a viewzone based on the frame and reducing or enlarging the video resolution inside the viewzone based on the metadata;

(iii) displaying the viewzone so that a vertical dimension of the viewzone matches a vertical dimension of the user device, and the focus point remains in the center of the viewzone and in the center of the user device;

(iv) upon user rotation of the user device, re-displaying the frame such that the focus point remains in the center of the device, and a horizontal dimension of the viewzone matches a horizontal dimension of the user device, and portions of the screen above and below the viewzone are rendered black; and (v) continuing rendering subsequent frames of the video, layers, and/or effects according to (i)-(iv), wherein the metadata includes an "effects" tag specifying effects and their parameters, and wherein the "effects" include low pass sound effect, high pass sound effect, audio equalizer effect, pitch effect, distortion effect, flange effect, resonance effect and/or echo effect.

18. The method of claim 15, wherein the "effects" include altering viewzone proportions or dividing the video frame into multiple frames inside viewzone.

19. A method for playing video in a format that matches a user device, the method comprising:

loading a video into a player;

downloading a file with metadata specifying resolution and crop parameters for user devices;

using the resolution and crop parameters that match the particular user device, performing (i) identifying a frame from the video and defining a focus point in a center of the frame;

(ii) defining a viewzone based the frame and reducing the resolution based on the metadata or data;

(iii) displaying the viewzone so that a vertical dimension of the viewzone matches a vertical dimension of the user device, and the focus point remains in the center of the frame and in the center of the user device;

(iv) upon user rotation of the user device, re-displaying the frame such that the focus point remains in the center of the device, and a horizontal dimension of the viewzone matches a horizontal dimension of the user device, and portions of the screen at the top or bottom of the viewzone are rendered black; and continuing rendering layers, effects and subsequent frames of the video in a viewzone according to (i)-(iv), wherein a timer is used to rotate the resolution and the crop parameters.

20. A system for playing video in a format that matches a user device, the system comprising:

a processor and a memory coupled to the processor, the processor configured to perform the following:

loading a video into a player;

downloading a file with metadata specifying resolution and crop parameters for user devices;

using the resolution and crop parameters that match the particular user device, performing (i) identifying a frame from the video and defining a focus point in a center of the frame;

(ii) defining a viewzone based the frame and reducing the resolution based on the metadata or data;
(iii) displaying the viewzone so that a vertical dimension of the viewzone matches a vertical dimension of the user device, and the focus point remains in the center of the frame and in the center of the user device;
(iv) upon user rotation of the user device, re-displaying the frame such that the focus point remains in the center of the device, and a horizontal dimension of the viewzone matches a horizontal dimension of the user device, and portions of the screen at the top or bottom of the viewzone are rendered black; and continuing rendering layers, effects and subsequent frames of the video in a viewzone according to (i)-(iv), wherein the effects include any of defining additional layers over the frame, displaying a layer over with a color, still image or another video that matches background of the original video, a low pass sound effect, high pass sound effect, audio equalizer effect, pitch effect, distortion effect, flange effect, resonance effect and echo effect, and wherein the player supports two playback regimes:
(1) the frame fully fits within the screen, and any marginal space is rendered in black, and (2) the frame is stretched along a maximum dimension, and a remainder of the frame is outside the screen.

* * * * *